US008301660B2

(12) United States Patent
Yalamanchi (10) Patent No.: US 8,301,660 B2
(45) Date of Patent: Oct. 30, 2012

(54) ENFORCING RESTRICTIONS FOR GRAPH DATA MANIPULATION OPERATIONS (75) Inventor: Aravind Yalamanchi, Nashua, NH (US)

(73) Assignee: Oracle International Corporation, Redwood Shores, CA (US)

(*) Notice: Subject to any disclaimer, the term of this patent is extended or adjusted under 35 U.S.C. 154(b) by 462 days.

(21) Appl. No.: 12/507,244

(22) Filed: Jul. 22, 2009

(65) Prior Publication Data
US 2011/0022636 A1 Jan. 27, 2011

(51) Int. Cl.
G06F 7/00 (2006.01)
(52) U.S. Cl. ............ 707/783; 707/794; 706/55; 706/56
(58) Field of Classification Search .................. None
See application file for complete search history.

(56) References Cited

U.S. PATENT DOCUMENTS

| | | | | |
|---|---|---|---|---|
| 4,933,848 | A * | 6/1990 | Haderle et al. ................... | 1/1 |
| 5,386,557 | A * | 1/1995 | Boykin et al. ................... | 1/1 |
| 5,408,657 | A * | 4/1995 | Bigelow et al. ................ | 707/822 |
| 5,706,494 | A * | 1/1998 | Cochrane et al. ............... | 1/1 |
| 5,899,993 | A * | 5/1999 | Jenkins, Jr. ..................... | 1/1 |
| 6,047,285 | A * | 4/2000 | Jacobs et al. .................. | 707/741 |
| 6,453,314 | B1 * | 9/2002 | Chan et al. ..................... | 1/1 |
| 7,272,589 | B1 * | 9/2007 | Guay et al. ..................... | 707/716 |
| 2004/0107200 | A1 * | 6/2004 | Sjogren et al. ................ | 707/100 |
| 2007/0234288 | A1 | 10/2007 | Lindsey et al. | |
| 2009/0300002 | A1 | 12/2009 | Thomas et al. | |
| 2010/0153149 | A1 * | 6/2010 | Prigge et al. ..................... | 705/7 |

OTHER PUBLICATIONS

Murray et al., Oracle Spatial Resource Description Framework (RDF) 10g Release 2 (10.2), Oct. 2005.*
US Patent and Trademark Non-Final Office Action in co-pending U.S. Appl. No. 12/386,560, filing date Apr. 20, 2009; notification date Oct. 21, 2011.
US Patent and Trademark Non-Final Office Action in co-pending U.S. Appl. No. 12/386,560, filing date Apr. 20, 2009; notification date Jun. 15, 2011.
US Patent and Trademark Non-Final Office Action in co-pending U.S. Appl. No. 12/386,560, filing date Apr. 20, 2009; notification date Feb. 27, 2012.

* cited by examiner

Primary Examiner — Vei-Chung Liang
(74) Attorney, Agent, or Firm — Kraguljac Law Group, LLC (57) ABSTRACT Systems, methods, and other embodiments associated with data manipulation operation restriction enforcement on graph data are described. A statement specifying a data manipulation operation to modify graph data that will modify one or more triples in the graph data is received. One or more resources that the one or more triples describe is determined. Data constraints associated with the resources are accessed. The access constraints are evaluated on the graph data. The data manipulation operation is selectively restricted based, at least in part on, the evaluation of the access constraints.

20 Claims, 7 Drawing Sheets

ENFORCING RESTRICTIONS FOR GRAPH DATA MANIPULATION OPERATIONS

BACKGROUND

Data access control mechanisms are used to restrict access to data within a data repository to authorized users. One common access control system is a Virtual Private Database (VPD). The VPD is a fine-grained access control mechanism that restricts users' access to specific instances of data stored in a common repository using application contextual information about the user and/or the session during which access is requested. When the data is stored in relational tables, access to specific rows in the table is controlled using a technique called query rewrite. This technique intercepts each user query and appends specific security conditions that filter out sensitive data that would otherwise be included in the result set of the query. The security conditions are dynamically generated based on the application context. The logic that generates appropriate security conditions for a given query is typically hand-coded by a security administrator. The security conditions that restrict users' access to data through standard query languages may be used to enforce restrictions for data manipulation (DML) operations.

VPD techniques, when applied to relational tables, restrict access to specific rows in the table by evaluating the security conditions on the corresponding rows. Often the security conditions are expressed using the columns defined in the table so that these conditions are evaluated in addition to any predicates in the WHERE clause of a user query. The security conditions may also make use of the application context to derive, for example, the employee's department number at the time of query execution, so that records relevant to the employee's department may be returned for the query. The same security condition, when in effect for DML operations, can be used to restrict users from performing unauthorized manipulation of data using SQL INSERT, UPDATE and DELETE statements. For example, a security condition can ensure that an INSERT operation by the user is accepted only if the security condition evaluates to true with the row being inserted. Similarly, an UPDATE operation on a row may be restricted if the security condition does not evaluate to true with the pre-update version of the row as well as the updated version of the row.

The relational data model is well suited for highly structured data with well-defined semantics, which are captured in the columns defined for the relational table. In contrast, graph data models, such as, for example, RDF data models are increasingly being used to store and manage graph data which is often less structured and less predictable than their relational counterparts. In addition, new data can be inferred from RDF data using inference engines and inference rules. In an RDF data model, the data is modeled as directed graphs and they are represented as a set of triples or statements. The nodes in the graph are used to represent two parts of a given triple, and the third part is represented by a directed link that describes the relationship between the nodes. In the context of an RDF statement, the two nodes are referred to as Subject and Object and the link describing the relationship is referred to as the predicate or Property.

Fine-grained security for relational data heavily leverages the concept of a row in enforcing the security policies that include restrictions on DML operations. The target of a DML operation on relational data is a row and the clearly defined boundaries of a row ensure that the user is unable to modify any value associated with the row if the security condition does not evaluate to true. In contrast, the notion of a row does not exist for the RDF data model and while the updates are performed at the triple level, the target of the DML, or graph manipulation, operation is a sub-graph that includes the set of triples being added or deleted and likely multiple other sets of triples.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

The graph data manipulation operation restriction enforcement techniques described herein allow for implementation of intuitive constraints that reuse the instance data to restrict the performance of DML operations on specific data instances to specific users. Hence a handful of strategic data access constraints may be used to restrict DML operation performance on large volumes of data. Furthermore, use of session context in the data access constraints allows enforcement of context-dependent DML operation restrictions. In many of the described embodiments RDF graph data is discussed, however it will be apparent to one of skill in the art that the data access control techniques described herein may be practiced with any type of graph data.

The security policies for data manipulation operations on relational data distinguish between different types of operations in order to enforce appropriate restrictions. For example, a user may be allowed to update employee information if he is the manager of the employee and at the same time he may be restricted from creating new employee records. In a relational data model, the type of operation the user performs and the effect of such operation on the database is apparent for the SQL command used—INSERT, UPDATE, or DELETE. Hence, security policies may be associated with specific command types to enforce specific restrictions.

However, in the case of an RDF data model, a DML operation involving a specific triple is characterized in terms of the effect it has on the graph. Specifically, insertion or deletion of a specific triple may really be an update of a resource that the triple describes. For example adding a triple asserting that an employee belongs to a specific department can be viewed as a modification of an employee resource corresponding to a sub graph that includes a set of triples that describe the resource. Often the true intent of a data manipulation operation is not apparent from the triple-level operation. For example, deletion of a resource is equivalent to deleting all the triples that describe the resource. However, if the deletions of individual triples are analyzed, the operation may be mischaracterized as (multiple) updates to the resource. The inherent differences between the relational and RDF data models introduce unique challenges in securing RDF data for the query and the DML operations. Furthermore, the security conditions that control access to specific resources and properties (for queries as well as DML operations) are expressed as graph patterns that involve some other parts of the graph with no clear boundaries.

Security policies that enforce access control for queries on RDF data, may not automatically enforce restrictions for DML operations. For example, if a constraint restricts read access to hasContractValue property of a contract to the manager of the contract, the same constraint when applied for DML operations, fails to secure the hasContractValue property without some DML specific handling, such as restricting the manipulation of the manager property itself. Unlike a relational data model, where each column is assumed to store an atomic value, an RDF data model allows multiple values to be associated with the same resource using the same property. In effect, a user can add triples with the hasManager property to a contract instance, unless this property is unconditionally restricted. When such a restriction is not in effect, a user can add himself as a manager for a contract and circumvent the restriction on accessing the hasContractValue property.

Object-level privileges granted on the database objects restrict a user's ability to query or perform data manipulation operations on the data stored in the object. These object-level access restrictions apply equally well for the relational data model and the RDF data model. A database object in the RDF data model stores information pertaining to a graph, the query and DML operation access to which can be granted to specific users. Fine-grained access control mechanisms work in conjunction with the object-level privileges to control access to data stored in some objects (graph) at the instance level. A specific example of an access control mechanism will be used for the purpose of the present description. However, any access control mechanism may be utilized to practice the DML operation restriction enforcement techniques and systems described herein. The access control mechanism semantics are extended to control users' write access to data at the instance level. The object level privileges to query and manipulate data stored in an object are managed independently such that a user with query privileges may not have any data manipulation privileges to the same object. So the enforcement of restrictions for query and DML operations may be independent of each other.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable storage medium", as used herein, refers to a medium that stores signals, instructions and/or data. A computer-readable storage medium may take forms, including, but not limited to, non-volatile media and volatile media. Non-volatile media may include, for example, optical disks, magnetic disks, and so on. Volatile media may include, for example, semiconductor memories, dynamic memory, and so on. Common forms of a computer-readable storage medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

In some examples, "database" is used to refer to a table. In other examples, "database" may be used to refer to a set of tables. In still other examples, "database" may refer to a set of data stores and methods for accessing and/or manipulating those data stores.

"Logic", as used herein, includes but is not limited to hardware, firmware, software stored on a computer-readable storage medium, and/or combinations of each to cause a processor to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

"Query", as used herein, refers to a semantic construction that facilitates gathering and processing information. A query may be formulated in a database query language (e.g., SQL, SPARQL), an OQL, a natural language, and so on.

"Software", as used herein, includes but is not limited to, one or more executable instruction stored on an computer-readable storage medium that cause a computer, processor, or other electronic device to perform functions, actions and/or behave in a desired manner. "Software" does not refer to stored instructions being claimed as stored instructions per se (e.g., a program listing). The instructions may be embodied in various forms including routines, algorithms, modules, methods, threads, and/or programs including separate applications or code from dynamically linked libraries.

"User", as used herein, includes but is not limited to one or more persons, software, computers or other devices, or combinations of these.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, determining, and so on, refer to actions and processes of a computer system, logic, processor, or similar electronic device that manipulates and transforms data represented as physical (electronic) quantities.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 1:
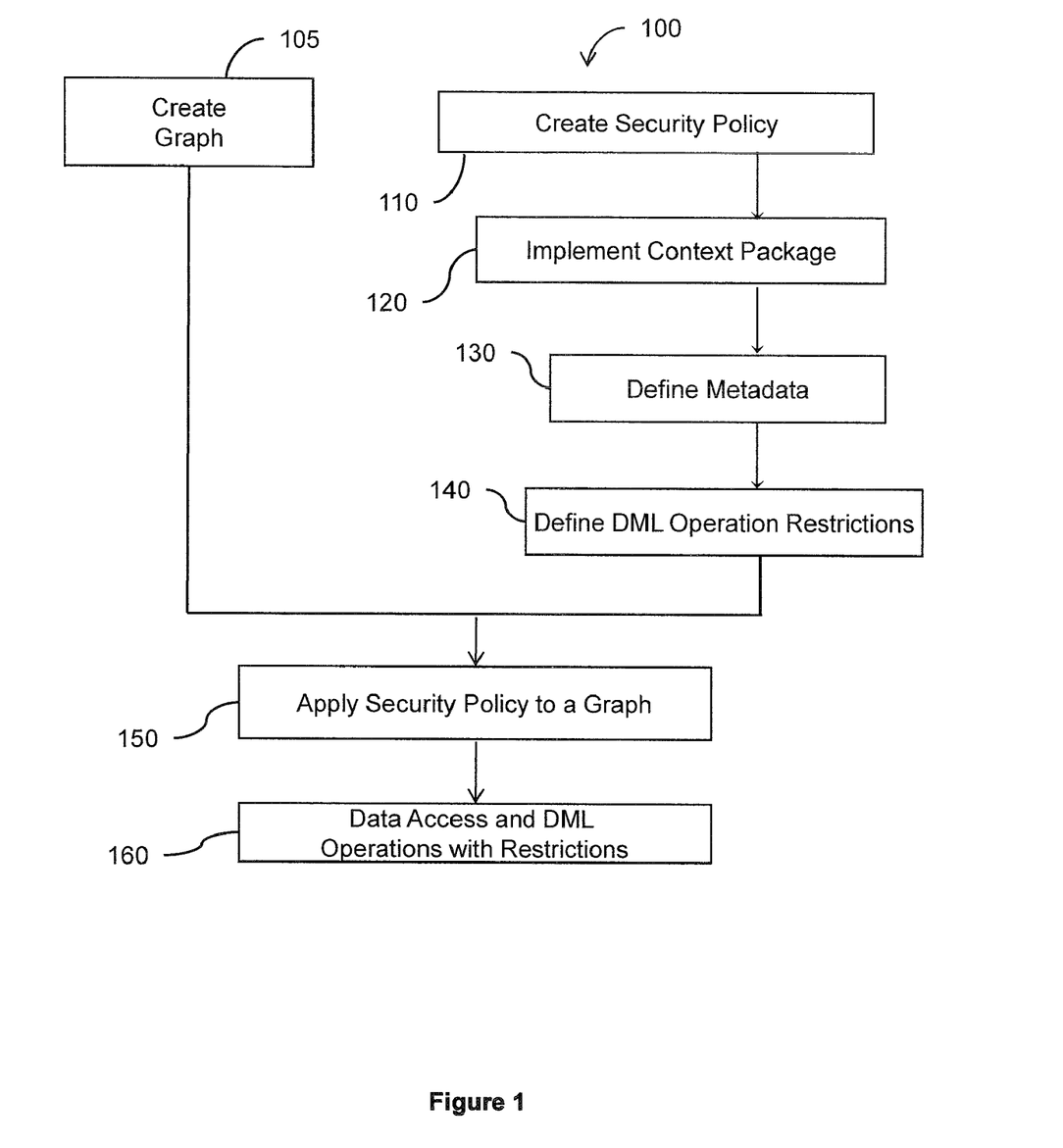
FIG. 1 illustrates an example embodiment of a method associated with DML operation restriction enforcement for RDF data.

FIG. 1 is an overview flow diagram of an embodiment of a method 100 for providing access and DML operation control for RDF data. At 105 an RDF graph is created. Unlike a relational data model, the RDF data model allows data with no accompanying metadata. Hence, the class information for instance data may not always be available for a given RDF graph. For example in an RDF graph, a resource known to be a contract may not accompany a triple that asserts that the resource is an instance of Contract class. Most often such triples can be inferred using available domain and range specifications for the properties describing the resource. Similarly a security policy that enforces access restrictions relies on the properties' domain and range specifications for deriving the class information for the instance data and for enforcing appropriate data access constraints. However, to avoid runtime dependencies on the user data, a security policy may maintain minimal metadata that can be used to derive the class information in its dictionary, separate from the asserted and inferred triples. This would also ensure that the metadata maintained by a security policy is complete even when some necessary information is missing from the asserted triples and that a security policy, with its data access constraints and the metadata, is self-contained, secure, and portable with no external dependencies.

At 110, a security policy is defined with a set of metadata statements and data access constraints may be used to restrict read and/or write access to RDF data at the instance level. The security policy has one or more data access constraints arranged into constraint groups that are selectively activated in a user session. Each data access constraint has a match and an apply pattern that are used to enforce the access restrictions. The match pattern identifies instances of a specific RDF class or RDF property, the (read or) write access to which are to be restricted. The apply pattern defines graph patterns that act as security conditions that should evaluate to true for the user graph (access or) manipulation operation to succeed.

The security policies that restrict a user's write access to RDF data are defined by a security administrator. In most cases, the same security policy may be reused to enforce access restrictions for query and DML operations (DELETE, INSERT, UPDATE). A security policy used to enforce access restrictions for query and DML operations behaves differently depending on the type of operation it is associated with. However, the semantics of the individual constraints defined in the security policy are the same independent of the type of operation they restrict. For example, a data access constraint that ensures that user's read access is limited to the contracts driven by his department can also ensure that he can only update information about contracts belonging to his department.

Match: {contract   rdf:type <http://www.morg.com/classes/Contract>}
Apply: {?contract   p:drivenby
                    (system context information for user's department)}

The above constraint, with a match pattern that matches all instances of Contract class and an apply pattern that appends the security policy to relevant user queries, enforces the desired restriction for query operations. The same constraint, when used in a security policy defined for DML operations on the graph, restricts manipulation of an instance of Contract class unless it belongs to the same department as the user manipulating it. However, the semantics for enforcing a DML operation are different from those of query time enforcement and also vary based on the type of the data manipulation operation attempted on the graph (deleting resources, inserting resources, updating some resources).

At 120, an application context package is implemented so that the constraint groups defined in a security policy are activated or deactivated for each user session based on the user's participation in a group. For example a set of constraints that enforce access restrictions for Managers in an organization may be defined in one group and the constraints that enforce access restrictions for Vice Presidents may be defined in another group. Appropriate constraint group may be activated for each user session based on the user's role in the organization. The logic that initializes specific constraint groups based on the user context is implemented by the security administrator that defines the security policy. Once a constraint group is activated for a user session, subsequent queries and data manipulation statements in the session consult the constraints defined in the group to enforce appropriate access restrictions.

At 130, RDF metadata is defined for use in maintaining and enforcing the security policy. Unlike a relational data model, an RDF data model may not always associate metadata or schema information for data stored in a graph. However, the security based access control mechanism relies on the metadata for the data being accessed and this is achieved by associating the metadata directly with the policy. For example, in order to apply a constraint for instances of Contract RDF class, the query analyzer should be able to recognize when an instance of this class is being accessed with a query or data manipulation statement. The types of RDF metadata collected by a security policy to facilitate this analysis include: domain and range information for the properties used in the graph; subclass relationships in the graph; subproperty relationships in the graph; and equivalent properties in the graph.

Using this RDF metadata, the class information for the data modified by a DML operation may be derived. For example, if the domain for hasContractValue property is asserted to be a Contract class (using the following RDF schema statement), it is concluded that the term <uri1> in the triple being added to the graph—[<uri>pred:hasContractValue "100000"^^xsd:integer] is an instance of Contract class and corresponding access constraints are applied:

pred:hasContractValue
      <http://www.w3.org/2000/01/rdf-schema#domain>
        class:Contract An RDF security policy maintains its metadata separate from the asserted and inferred triples and this metadata may be programmatically derived from the RDF graph and the inferred data, when possible. For example, if the domain and range information for the properties and subclass and sub-property relationships are already established in the asserted and/or inferred triples, a query on the underlying graphs may be used to populate the metadata for an RDF security policy.

The domain and range information for the properties aid the query analysis in determining the RDF Class type for the terms referenced in triples being added or deleted using a DML operation. This information is further used to enforce appropriate data access constraints on the data. The metadata relating to the subclass property is used to ensure that a DML operation constraint defined for a specific class in a class hierarchy is automatically enforced for its subclasses. Similarly, the sub-property specification in a security policy is used to enforce any constraints associated with a property to its sub-properties.

Returning to FIG. 1, at 140, data access and DML operation constraints are defined. Each data access constraint in the security policy is expressed using two graph patterns identified as a match pattern and an apply pattern. The match pattern of a constraint determines the type of access restriction it enforces and binds one or more variables to the resources that will be affected by the DML operation. The apply pattern of a data access constraint defines graph patterns to be applied on the resources identified by the match pattern for evaluation prior to allowing execution of a DML operation. One or more variables defined in the match pattern of a data access constraint are used in the corresponding apply pattern to enforce the access restrictions on the identified resources. Effectively, the graph patterns defined in an apply pattern form a security condition that restricts manipulation of sensitive instance data.

At 150, the security policy is applied to the RDF graph for specific types of operations on the graph, such as query or DML or both. Subsequent queries and DML operations on the RDF graph will be subject to the security policy. At 160, queries and DML operations are processed with enforcement of access restrictions. A DML operation issued on an RDF graph with a security policy is analyzed using the match patterns of the active data access constraints defined in the policy.

DML operations broadly fall into three types: INSERT, UPDATE, and DELETE. In the case of a relational data model, the type of operation attempted is characterized by the command used to perform the operation. When SQL interfaces are used to manipulate RDF data stored as graphs, INSERT, UPDATE and DELETE operations are used to manipulate individual triples that in turn describe some resources. Since each triple that includes a Subject, Property, and Object, forms a unique key, an UPDATE to a triple is typically considered as a DELETE followed by an INSERT. Because a resource is described using a set of triples, a DML operation on an RDF graph can be characterized by the effect it has on a specific resource.

Figure 2A:
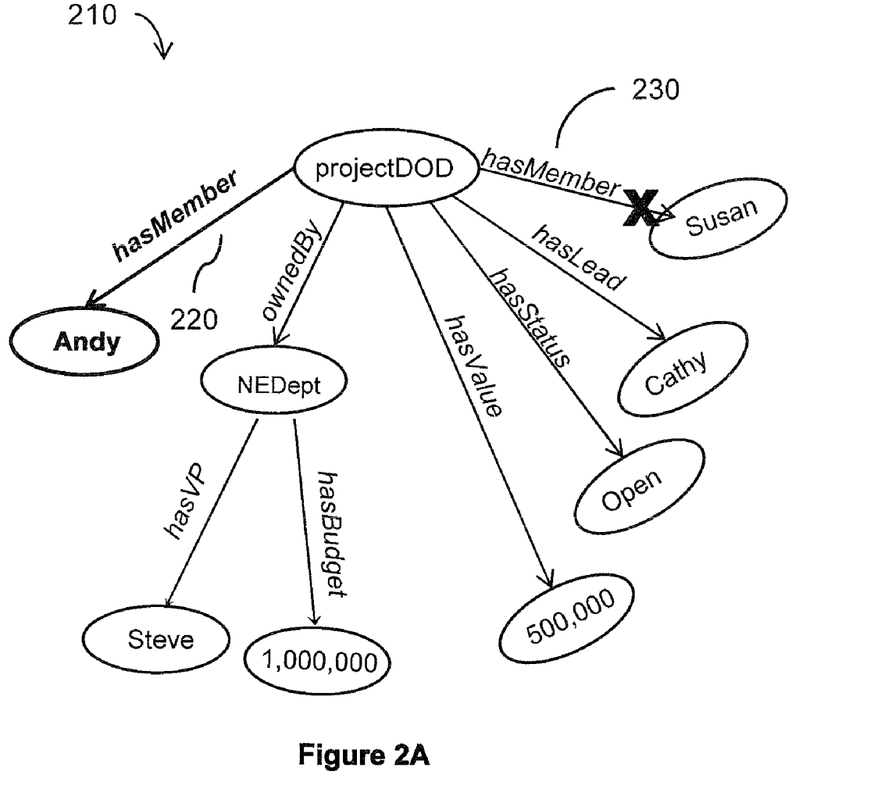
FIGS. 2A and 2B illustrate example RDF graphs associated with a described embodiment of DML operation restriction enforcement for RDF data.

FIG. 2A depicts an example graph 210 depicting several triples describing the resource projectDOD that will be used to illustrate DML operations. The graph 220 includes several triples that described the resource projectDOD. A SQL INSERT statement that adds another triple with the same contract instance as the subject is effectively updating the resource. For example, the SQL statement "INSERT INTO ContractsGraph VALUES (':projectDOD', 'p:hasMember', "Andy"^^xsd:string') will result in the new triple 220 being added to the graph 210. Similarly, a SQL DELETE statement that deletes a specific triple may also be updating the resource. For example, the DML statement "DELETE FROM ContractsGraph WHERE subject=':projectDOD' and property='p:hasMember' and object='"Susan^^xsd:string"'" will result in triple 230 being deleted from the graph 210. Hence, the deletion of the triple that identifies Susan as a member of projectDOD is an update to the resource projectDOD.

Figure 2B:
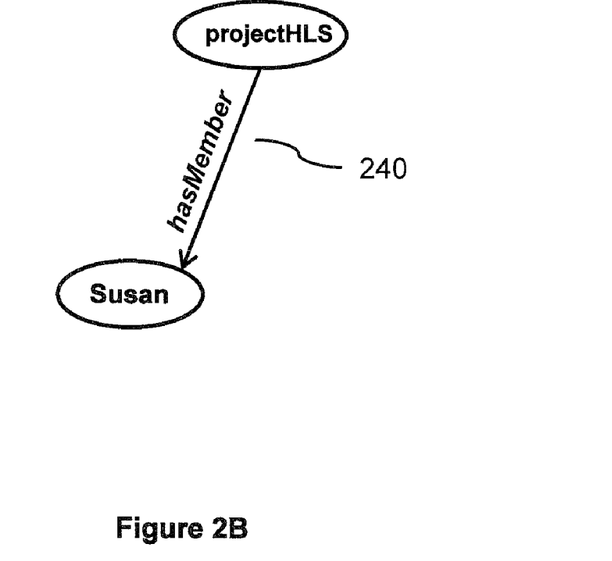

Under the assumption that DML operations can usually be characterized as updates to a resource, a DML operation is determined to create or insert a resource if it inserts a triple that describes a resource that was not already described using some property in the graph. That is, if a resource appears in the subject position of a newly added triple and no other triple in the graph has the same resource, it is assumed that a new resource (with its description) is created/inserted. For example, as shown in FIG. 2B, the SQL statement that inserts a new triple [:projectHLS p:hasMember "Susan^^xsd:string"] creates a new resource because no other triples existed prior to execution the SQL statement that describe projectHLS. DML operations that will result in the deletion of an existing resource or the creation of a new resource are checked for authorization using different techniques and a security policy may specify that such "true" INSERT and DELETE operations require a higher level of authorization.

Figure 3:
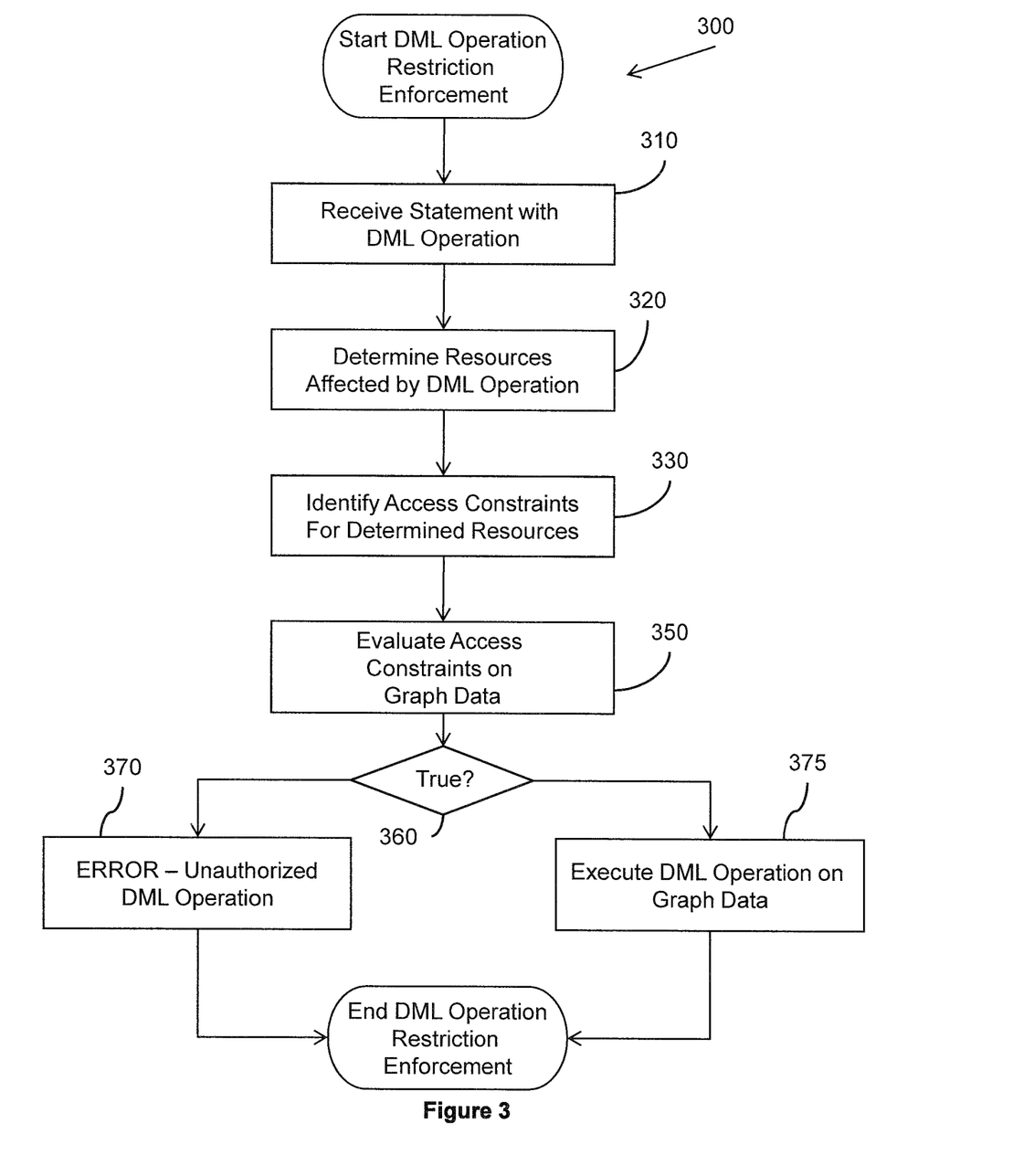
FIG. 3 illustrates an example embodiment of a method associated with DML operation restriction enforcement for RDF data.

FIG. 3 is a flow diagram that describes an example embodiment of a method 300 for enforcing DML operation restrictions. At 310, a statement, such as a SQL statement, is received by a query processing system. The statement includes one or more DML operations. At 320, the resources affected by the DML operation are determined. This determination may be made by grouping all triples that share a common subject into a single resource and identifying all resources that include a triple that will be affected by the DML operation. At 330, data access constraints for the determined resource or resources is identified. In the described embodiment, the data access constraints are expressed as match pattern, apply pattern pairs, however, any method of expressing and enforcing data access constraints can be used. At 350, the DML operation is evaluated on the graph data utilizing the access constraints specified in the apply pattern. The evaluation may be performed by determining if a source of the DML operation has access to the resource prior to execution of the DML operation, after execution of the DML operation, or both prior to and after execution of the DML operation. At 360 and 370, if the evaluation does not resolve to true, an error is generated and the DML operation is not executed. At 360 and 370, if the evaluation resolves to true, the DML operation is executed on the graph data.

While FIG. 3 illustrates various actions occurring in serial, it is to be appreciated that various actions illustrated in FIG. 3 could occur substantially in parallel. By way of illustration, a first process could receive the statement, a second process could determine resources affected by the DML operation, and a third process could identify data access constraints, and a fourth process could evaluate the access constraints. While four processes are described, it is to be appreciated that a greater and/or lesser number of processes could be employed and that lightweight processes, regular processes, threads, and other approaches could be employed.

In one example, a method may be implemented as computer executable instructions. Thus, in one example, a computer-readable storage medium may store computer executable instructions that when executed by a machine (e.g., processor) cause the machine to perform a method that includes receiving a statement specifying a DML operation to modify graph data that will modify one or more triples in the graph data; determining one or more resources that the one or more triples describe; accessing a data constraints associated with the resources; accessing the graph data to evaluate the access constraints associated with the resources; and executing the DML operation if the access constraints evaluate to true. While executable instructions associated with the above method are described as being stored on a computer-readable storage medium, it is to be appreciated that executable instructions associated with other example methods described herein may also be stored on a computer-readable storage medium.

Often a single SQL statement may modify multiple rows in a table. In the case of relation data, regardless of the number of rows modified by a SQL statement, the impact of a DML operation can be measured at the row level. That is, violation of a security policy can be determined based on each modified row and it may not vary based on other rows modified by the same statement. However, in the case of the RDF data model, a higher abstraction should be used to capture the real intent of the operation that manipulates multiple triples using a single SQL statement. This abstraction characterizes the DML operation appropriately and also seeks to ensure that the data access constraint with multiple triple patterns in the apply pattern do not prevent authorized DML operations.

Figure 4A:
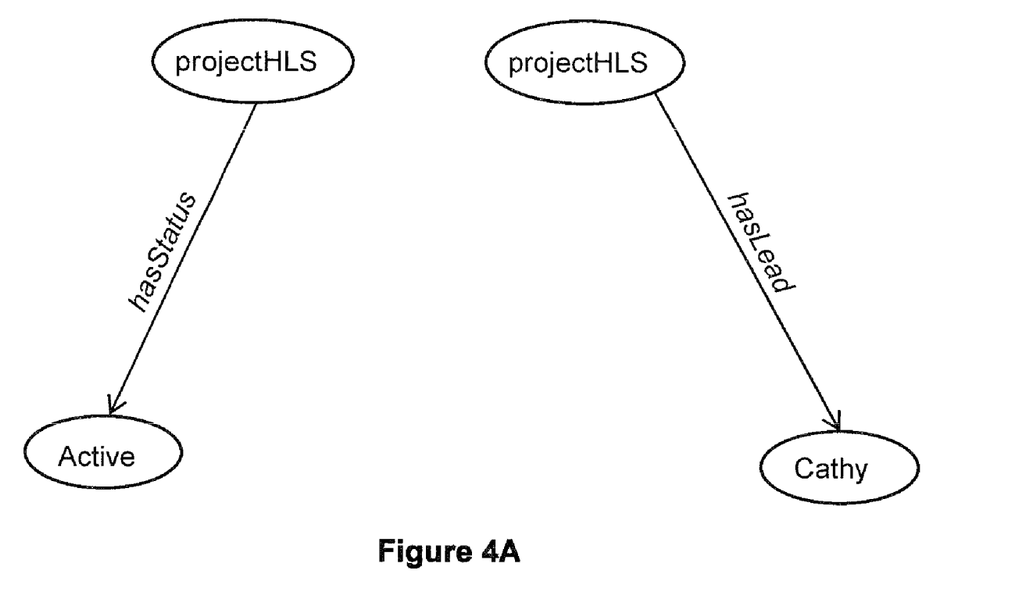
FIGS. 4A and 4B illustrate example RDF graphs associated with a described embodiment of DML operation restriction enforcement for RDF data.

For example, data access constraints associated with a project type resource may be defined to restrict access to projects to the project leaders and to the projects that are active. FIG. 4A illustrates two triples that a user may seek to insert to create a new project "projectHLS". With the data access constraints in place, when an authorized user tries to create the new project, all attempts to validate the constraint for individual triples will fail and thus prevent the user from creating the resource. That is, when the resource is being added by inserting triples describing the resource "projectHLS" the constraint validated immediately after the first triple is processed will fail because the hasManager property does not yet exist for the resource (i.e., does not match the security condition form the apply pattern). The outcome is similar when the triples are added in the reverse order.

Figure 4B:
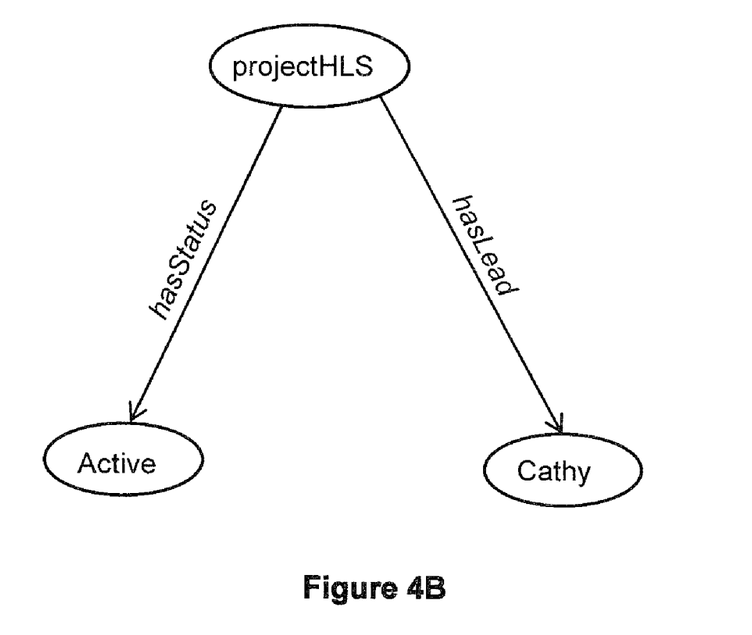

When the effect of a DML operation on an RDF graph is measured at the statement level instead of the triple/row level, the constraints are enforced effectively. A user can group multiple triple-level operations into a single SQL statement (using INSERT AS SELECT, for example) to perform the desired DML operation on an RDF graph. FIG. 4B illustrates the two triples of FIG. 4A combined to describe the resource "projectHLS" in a manner that would be validated by the data access constraints. Effectively, a single SQL statement (INSERT/UPDATE/DELETE) can insert zero or more RDF resources, update zero or more resources by adding specific properties or delete zero or more resources. Separate security policies may be associated with different types of operations on the resources (INSERT/UPDATE/DELETE) such that the appropriate policy is enforced based on the effect the DML operation has on a given resource. Hence, each resource impacted by a SQL statement is validated for access constraints using an appropriate security policy.

A security policy defined for enforcing access restrictions for query operations on an RDF graph may also be used to enforce access restrictions for data manipulation operations. However, the techniques employed to enforce the access restrictions vary on the type of DML operation being performed. The access restrictions may be evaluated on multiple versions of the data. For example, the constraints are evaluated on graphs describing a resource prior to and after execution of a DML operation that is characterized as an UPDATE. Furthermore, a single SQL statement may affect multiple resources in the RDF graph in different ways. Hence, the access restrictions for DML operations are enforced by iterating over the resources that are affected by a given SQL statement and the operation is restricted if at least one of of the resources fails a security condition from the corresponding data access constraints.

A security policy enforcing access restrictions for update operations on existing resources may include some special characteristics. A typical security policy has one or more data access constraints associated with specific RDF classes and properties through their match patterns. These constraints are defined by a security administrator and hence are explicitly defined. In addition to these explicit constraints, a security policy enforcing access restrictions for DML operations has implicit constraints that are derived from the explicit constraints. An implicit data access constraint is generated for each RDF property referenced in the apply pattern of some explicit constraint and the implicit constraint is defined with an apply pattern that will always evaluate to false. The implicit constraints, which are enforced for operations updating some RDF resource, seek to ensure that the user is not able to circumvent the explicit data access constraints.

For example, if a data access constraint stipulates that only a manager of a contract can update its hasContractValue property (or create a triple with this property or delete the triple), a malicious user may be able to add a triple asserting that he is the manager of the contract using the hasManager property and then updating the hasContractValue property unless the hasManager property itself is protected with a data access constraint. In the following example, the implicit constraint on the hasManager property enforces this restriction automatically:

```
Explicit Constraint in MANAGER constraint group:
Match: { ?contract    pred:hasContractValue  ?cvalue       }
Apply: { ?contract    pred:hasManager
                      (system context information for user) }
Implicit Constraint in MANAGER constraint group:
Match: { ?contract    pred:hasManager  ?manager }
Apply: { FILTER (1=0)         }  --always false-
```

Note that the implicit constraints belong to the same constraint group as the explicit constraints from which they are derived and multiple explicit constraints referring to the same property in their apply patterns create a single implicit constraint for the property.

In addition to the implicit constraints that are enforced for the security policies restricting update operations on RDF resources and properties, the system has some high level constraints that are enforced for all types of DML operations. These constraints seek to ensure that only a user with unrestricted (FULL) access to the security policy can make use of reserved properties defined 30 for schema modeling. These may include properties defined in rdfs and owl namespaces such as owl:sameAs, rdfs:subClassOf, rdfs:subPropertyOf and other properties that may have an unintended effect on securing the resources when combined with inference. For example, owl:sameAs may be used to assert that two resources, identified by distinct URIs are one and the same. So, for the above example, a user with sufficient insert privileges may create a new contract with himself as the manager and, with no restriction on owl:sameAs property, may also assert that the new contract is the same as the original contract. Effectively the user is able to use his insert privileges to perform an update on the contract he does not have update privileges on.

In a system that supports incremental inference the effect of allowing the triple with owl:sameAs property is immediate. However, in a system where inference is offline and initiated by an administrator, the effect of adding such properties is deferred and possibly controlled. The constraints that restrict the use of reserved properties by an user other than one with unrestricted access seek to ensure that the access restrictions are upheld independent of the kind of inference employed by the system.

Figure 5:
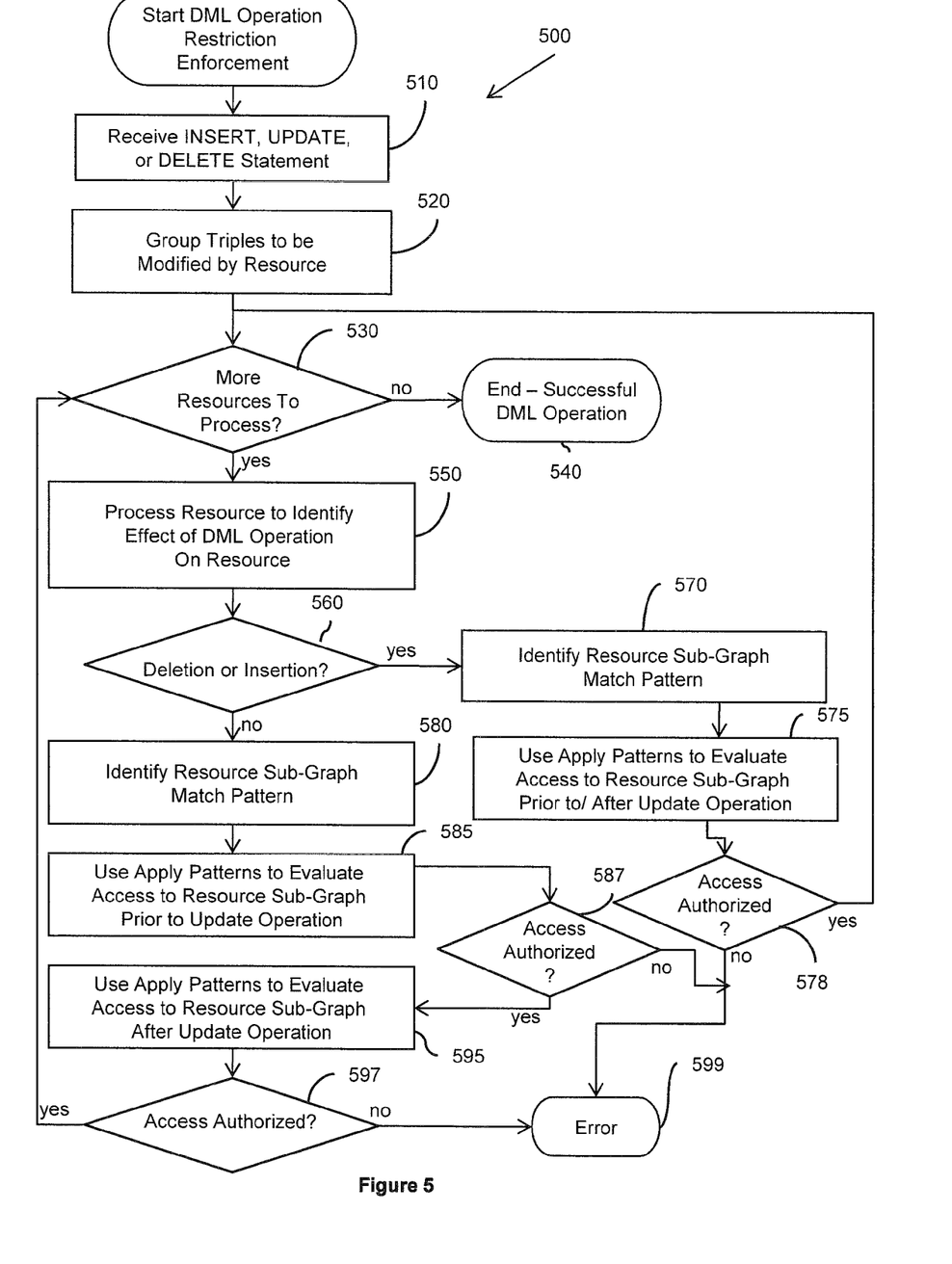
FIG. 5 illustrates an example embodiment of a method associated with DML operation restriction enforcement for RDF data.

FIG. 5 is a flow diagram that outlines an example embodiment of a method 500 that enforces restrictions on DML operations. At 510, a statement that includes a DML operation is received. At 520, triples that are to be modified by the DML operation are grouped by resource. In some embodiments, individual triples with the same subject are considered to describe a single resource. At 530, a check is made to determine if any resources remain to be processed. After all resources have been processed, at 540, the DML operation will be successful.

At 550, if there is a resource remaining to be processed, the effect of the DML operation on the resource is identified as follows. A statement adding or more triples is considered to insert a new resource into the graph if no triple with a matching subject exists in the graph prior to the operation. Insertion of a triple could result from a SQL INSERT or UPDATE statement. In the case of UPDATE, the new version of the triple is considered inserted. A SQL statement deleting one or more triples is considered to delete a resource if no triple with a matching subject is left in the graph after the operation. Deletion of a triple could result from a SQL DELETE or UPDATE statement. In the case of UPDATE, the older version of the triple is considered deleted. A SQL statement adding and/or deleting a subset of triples describing a resource is considered to update a resource. A single SQL statement may insert (or create), delete, and/or update one or more RDF resources.

At 560, when a SQL statement is determined to inserting/creating a new RDF resource with a set of trinles describing its properties, the security policy defined for insert operations on the graph is enforced. At 570, zero or more data access constraints are identified, based on their match patterns, for the RDF resources from within the active constraint group. A resource could be identified as an instance of multiple RDF classes through a class hierarchy (defined in the security policy metadata) or through the properties used to describe the resources. For example, two triples describing the resource may make use of properties with different domain specifications, thereby associating multiple RDF classes for a single resource. The RDF class information and the properties defined for the resource are used to identify the appropriate data access constraints based on their match pattern. The apply patterns for these identified constraints are used to restrict the user operation.

At 575, data access constraints are evaluated. The creation of the new resource is restricted at 578 if any of the identified data access constraints' apply patterns prevent the same user from accessing the resource or any of its properties once the resource is in the RDF graph and an error is generated at 599. Otherwise, the method 500 returns to 530 to process a next resource, if any is present. In effect, if the user inserting the resource cannot access the resource or any of it properties owing to the data access constraints, he cannot insert the resource into RDF graph.

At 560, when a SQL statement is determined to be deleting a resource, a similar analysis is performed at 570 to identify the class information of the impacted resources and the relevant data access constraints are identified based on the class information and the impacted properties. The identified data access constraints, specifically their apply patterns, are used to enforce restrictions on the user operations. At 575 the access constraints are evaluated. At 578 a delete operation is restricted if the identified data access constraints prevent the user from accessing the resource or any of its properties prior to the delete operation and an error is generated at 599. Otherwise, the method 500 returns to 530 to process a next resource, if any is present. Note that this is not equivalent to enforcing the constraint after deletion of each triple (with the specific property), as the constraints may not succeed with the partial description of the resource after deletion of each triple.

When a SQL statement is determined at 560 to be updating a resource by modifying a subset of the resource triples, the impacted resource and the properties are used to identify match patterns that describe the resource at 580. For update operations, these include the implicit constraints that restrict a user form modifying properties that are used in the apply pattern of some data access constraint. For a user to successfully update a resource, he must have access to the resource and the deleted triple(s) prior to the update operation as evaluated at 585. If he does not have access to the resource and deleted triples prior to the update operation as determined at 587, the update operation is restricted and an error is generated at 599.

If the user has access to the resource and the deleted triple (s) prior to the update operation as evaluated at 585, at 595 he must have access to the updated resource and the newly inserted triples. If he does not have access to the updated resource and newly inserted triples prior to the update operation as determined at 597, the update operation is restricted and an error is generated at 599. Note that an update to a triple is treated as deleting the old triple and reinserting a new triple. For example, if a data access constraint has a FILTER clause that stipulates that the user can only access contracts with a monetary value less than 100,000 dollars, an update operation that deletes the triple corresponding to a contract's value being less than 100,000 dollars inserts a triple having a value over 100,000 dollars is restricted as the constraint evaluates to false with respect to the new triple after the update operation.

Figure 6:
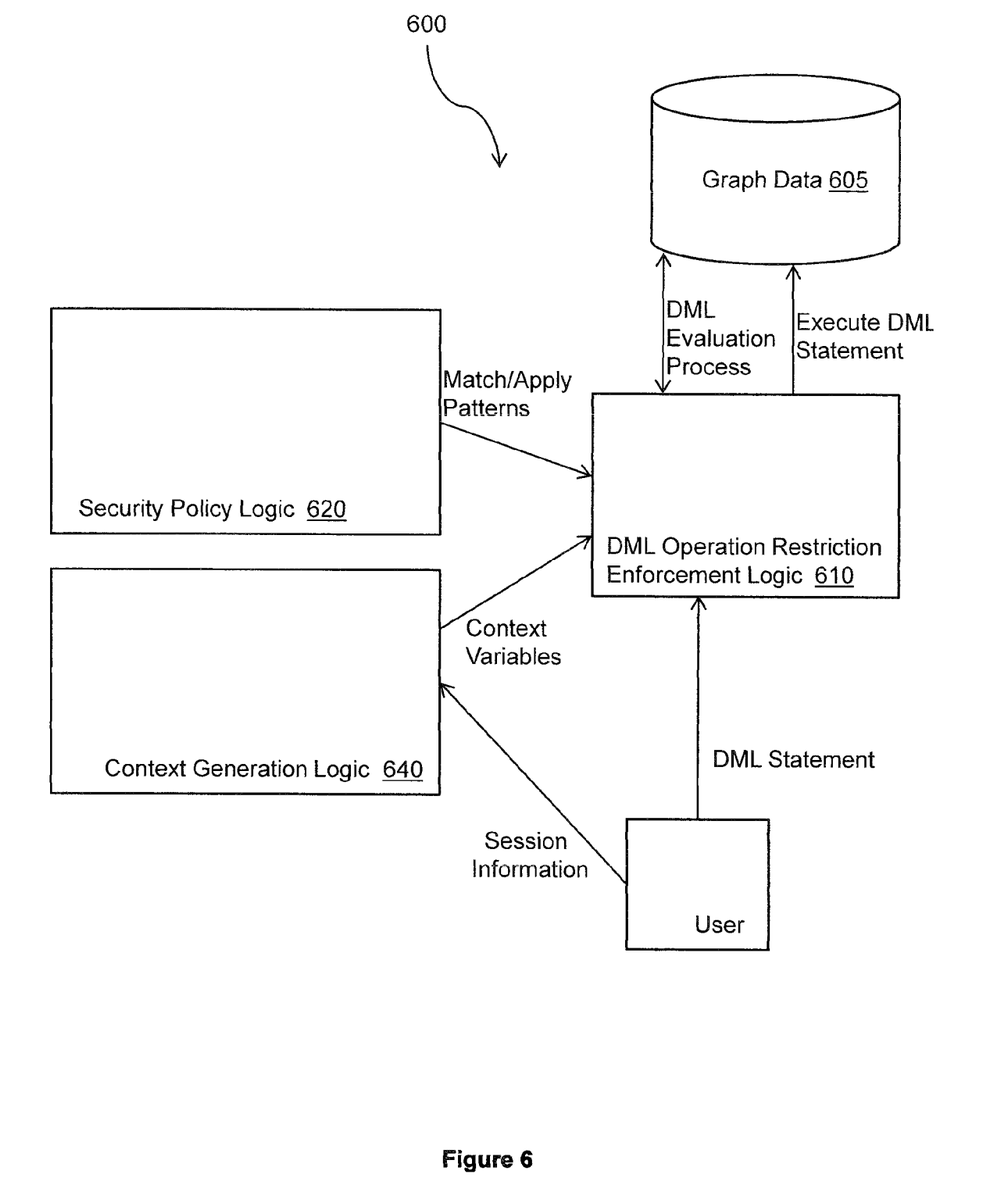
FIG. 6 illustrates an example embodiment of a system associated with DML operation restriction enforcement for RDF data.

FIG. 6 illustrates an embodiment of a system for controlling access to RDF data 600. RDF graph data is stored in a database 605. A user seeking to modify RDF graph data executes a statement that includes a DML operation. DML operation restriction enforcement logic 610 receives the statement. To enforce any restrictions on the DML operation, the DML operation restriction enforcement logic 610 communicates with a security policy logic 620. The security policy logic 620 generates data access constraints expressed as match pattern and apply pattern pairs, where each match pattern identifies some resources, and where an associated apply pattern specifies a sub-graph describing an access constraint associated with the resources. The DML operation restriction enforcement logic 610 evaluates the access constraints with respect to any DML operation that modifies a triple that describes the resource.

The DML operation restriction enforcement logic 610 determines one or more match patterns corresponding to one or more resources that will be modified by execution of the one or more DML operations and evaluates access constraints associated with the resource as specified by the one or more apply patterns that are paired with the determined match patterns. The DML operation restriction enforcement logic 610 may access the graph data to determine the effect of the DML operation on the graph data in order to evaluate the data access constraints. If the access constraints evaluate to true, the DML operation restriction enforcement logic 610 allows execution of the DML operation.

In some embodiments, the system includes a context generation logic 640 that retrieves context information regarding a DML operation processing session and further where the DML operation restriction enforcement logic accesses the context information to evaluate the access constraints.

Figure 7:
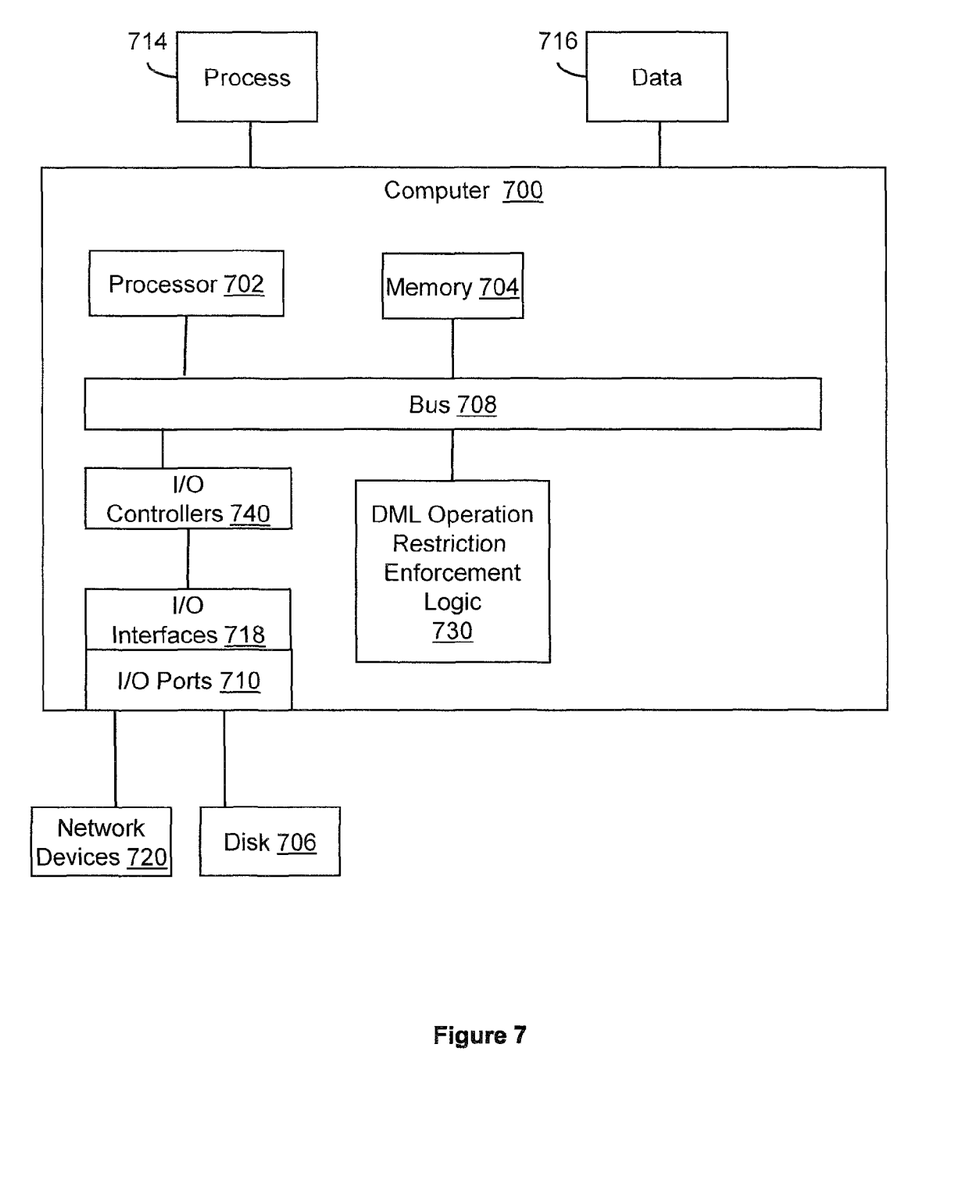
FIG. 7 illustrates an example computing environment in which example systems and methods, and equivalents, may operate.

FIG. 7 illustrates an example computing device in which example systems and methods described herein, and equivalents, may operate. The example computing device may be a computer 700 that includes a processor 702, a memory 704, and input/output ports 710 operably connected by a bus 708. In one example, the computer 700 may include a DML operation restriction enforcement logic 730 configured to facilitate restricting DML operations on RDF data. In different examples, the logic 730 may be implemented in hardware, software, firmware, and/or combinations thereof. While the logic 730 is illustrated as a hardware component attached to the bus 708, it is to be appreciated that in one example, the logic 730 could be implemented in the processor 702.

Thus, logic 730 may provide means (e.g., hardware, firmware) for restricting DML operations on RDF data.

The means may be implemented, for example, as an ASIC programmed to restricting DML operations on RDF data. The means may also be implemented as computer executable instructions that are presented to computer 700 as data 716 that are temporarily stored in memory 704 and then executed by processor 702.

Generally describing an example configuration of the computer 700, the processor 702 may be a variety of various processors including dual microprocessor and other multi-processor architectures. A memory 704 may include volatile memory and/or non-volatile memory. Non-volatile memory may include, for example, ROM, PROM, and so on. Volatile memory may include, for example, RAM, SRAM, DRAM, and so on.

A disk 706 may be operably connected to the computer 700 via, for example, an input/output interface (e.g., card, device) 718 and an input/output port 710. The disk 706 may be, for example, a magnetic disk drive, a solid state disk drive, a floppy disk drive, a tape drive, a Zip drive, a flash memory card, a memory stick, and so on. Furthermore, the disk 706 may be a CD-ROM drive, a CD-R drive, a CD-RW drive, a DVD ROM, and so on. The memory 704 can store a process 714 and/or a data 716, for example. The disk 706 and/or the memory 704 can store an operating system that controls and allocates resources of the computer 700.

The bus 708 may be a single internal bus interconnect architecture and/or other bus or mesh architectures. While a single bus is illustrated, it is to be appreciated that the computer 700 may communicate with various devices, logics, and peripherals using other busses (e.g., PCIE, 1394, USB, Ethernet). The bus 708 can be types including, for example, a memory bus, a memory controller, a peripheral bus, an external bus, a crossbar switch, and/or a local bus.

The computer 700 may interact with input/output devices via the i/o interfaces 718 and the input/output ports 710 input/output devices may be, for example, a keyboard, a microphone, a pointing and selection device, cameras, video cards, displays, the disk 706, the network devices 720, and so on. The input/output ports 710 may include, for example, serial ports, parallel ports, and USB ports.

The computer 700 can operate in a network environment and thus may be connected to the network devices 720 via the i/o interfaces 718, and/or the i/o ports 710. Through the network devices 720, the computer 700 may interact with a network. Through the network, the computer 700 may be logically connected to remote computers. Networks with which the computer 700 may interact include, but are not limited to, a LAN, a WAN, and other networks.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

What is claimed is:

1. A non-transitory computer-readable storage medium having computer-executable instructions stored thereon that when executed by a computer perform a method, the method comprising:
   receiving a statement specifying a data manipulation operation on a set of triples stored as graph data, where the graph data represents triples as sub-graphs, where the data manipulation operation, when executed, modifies or deletes one or more existing triples or inserts one or more triples in the graph data;
   identifying one or more resources that the one or more triples describe;
   accessing a security policy comprising access constraints to select access constraints associated with the identified resources;
   determining an operation type of the data manipulation language operation;
   based, at least in part, on the operation type, determining one or more sub-graphs of the graph data for evaluating the selected access constraints, where the determined sub-graphs include one or more of: i) a sub-graph that corresponds to the graph data prior to execution of the data manipulation language operation and ii) a sub-graph that corresponds to the graph data after execution of the data manipulation operation;
   evaluating the selected access constraints on the determined one or more sub-graphs; and
   executing the data manipulation operation if the access constraints evaluate to true for the determined one or more sub-graphs.

2. The computer-readable storage medium of claim 1 where the method includes accessing context information about a source of the statement to evaluate the access constraints.

3. The computer-readable storage medium of claim 1 where the determining of one or more resources is performed by identifying, as a resource, a subject of the one or more triples that will be, inserted, or deleted by execution of the data manipulation operation.

4. The computer-readable storage medium of claim 3 where a data manipulation operation is classified as an insert operation if no triples exist in the graph data having the identified subject prior to execution of the data manipulated operation.

5. The computer-readable storage medium of claim 4 where the accessing of graph data to evaluate the access constraints with respect to an insert operation is performed on graph data corresponding to the graph data after execution of the data manipulation operation.

6. The computer-readable storage medium of claim 3 where a data manipulation operation is classified as a delete operation if after execution of the data manipulation operation no triples exist in the graph data having the identified subject.

7. The computer-readable storage medium of claim 6 where the accessing of graph data to evaluate the access constraint with respect to a delete operation is performed on graph data corresponding to the graph data prior to execution of the data manipulation operation.

8. The computer-readable storage medium of claim 1 where the access constraints are expressed as match pattern and apply pattern pairs and further comprising:
identifying one or more match patterns corresponding to the identified one or more resources; and
selecting one or more apply patterns that are associated with the identified match pattern, where the apply patterns specify one or more access constraints associated with the resource described by the match pattern, the match pattern and apply pattern together describing a sub-graph that defines the resource and its access constraints.

9. The computer-readable storage medium of claim 8 where evaluating the access constraints is performed by using the apply pattern to determine if a source entity of the statement may access all of the one or more sub-graphs defined by the one or more match and apply patterns.

10. The computer-readable storage medium of claim 9 where the method comprises generating an implicit access constraint for each property in the one or more apply patterns, the implicit access constraint preventing execution of a data manipulation operation that results in a modification of any triples in the graph data that include the property.

11. The computer-readable storage medium of claim 1 where the determining of one or more resources is performed by identifying, as a first resource, a subject of an existing triple that is modified by the data manipulation operation and, as a second resource, a subject of a triple that results from the modification of the existing triple, where a data manipulation operation is classified as an update operation if before and after execution of the data manipulation operation at least one triple exists in the graph data having the identified first resource and at least one triple exists in the graph data having the identified second resource.

12. The computer-readable storage medium of claim 11 where the accessing of graph data to evaluate the access constraint with respect to an update operation is performed on graph data corresponding to the graph data both prior to execution of the data manipulation operation and after execution of the data manipulation operation.

13. The computer-readable storage medium of claim 1 where the method comprises generating an implicit access constraint for one or more reserved properties, the implicit access constraint preventing execution of any data manipulation operation that results in a modification of any triples in the graph data that include the property by an entity not having authorization to modify triples with reserved properties.

14. The computer-readable storage medium of claim 1 where the data manipulation operation comprises modifications to two or more triples, the method comprising evaluating the access constraints on a sub-graph that reflects modifications to data that result from the data manipulation operations.

15. A computing system comprising:
computer-readable storage media configured to store a set of triples as graph data that represents triples as sub-graphs in the graph data;
a processor;
a security policy logic configured to cause the processor to generate data access constraints expressed as match pattern and apply pattern pairs, where each match pattern is associated with a resource, and where an associated apply pattern specifies a sub-graph describing one or more access constraints associated with the resource;
an access control enforcement logic configured to cause the processor to receive a data manipulation statement comprising one or more graph manipulation operations, determine one or more match patterns corresponding to one or more resources that are modified by execution of the one or more graph manipulation operations; evaluate access constraints associated with the resource as specified by the one or more apply patterns that are paired with the determined match pattern, and selectively restrict the one or more graph manipulation operations based, at least in part, on the access constraints; and
a graph manipulation operation restriction enforcement logic configured to cause the processor to evaluate the access constraints by using the apply pattern to determine if a source entity of the statement may access all of the one or more sub-graphs specified by the one or more apply patterns.

16. The computing system of claim 15 comprising a context generation logic configured to cause the processor to retrieve context information regarding a graph manipulation operation processing session and further where the DML operation restriction enforcement logic accesses the context information to evaluate the access constraints.

17. The computing system of claim 15 where the graph manipulation operation restriction enforcement logic is configured to cause the processor to determine one or more resources by identifying, as a resource, a subject of the one or more triples that will be inserted or deleted by execution of the data manipulation operation.

18. The computing system of claim 17 where the graph manipulation operation restriction enforcement logic is configured to cause the processor to:
classify a graph manipulation operation as an insert operation if no triples exist in the graph data having the identified subject and evaluates the access constraints with respect to the INSERT operation on graph data corresponding to the graph data after execution of the DML operation; and
classify a graph manipulation operation as a delete operation if after execution of the graph manipulation operation no triples will exist in the graph data having the identified subject and evaluates the access constraints with respect to the delete operation on graph data corresponding to the graph data before execution of the graph manipulation operation.

19. The computing system of claim 15 where the graph manipulation operation restriction enforcement logic is configured to cause the processor to:
identify, as a first resource, a subject of an existing triple that is modified by the data manipulation operation and, as a second resource, a subject of a triple that results from the modification of the existing triple; and
classify a graph manipulation operation as a update operation if both before and after execution of the graph manipulation operation at least one triples exists in the graph data having the identified subject, and evaluate the access constraints with respect to the update operation on graph data corresponding to the graph data both before and after execution of the graph manipulation operation.

20. A system, comprising:

means for storing a set of triples as graph data that represents triples as sub-graphs in the graph data;

means for expressing data constraints in a security policy as match pattern and apply pattern pairs where each match pattern specifies a match pattern criteria that identifies one or more resources that are subject to the security policy, and where associated apply pattern specifies one or more security conditions, expressed as sub-graphs that describe the resource, to be evaluated with each data manipulation statement that includes a graph manipulation operation that will modify a triple that describes the resource that satisfies the match pattern criteria;

means for compiling and storing the match pattern and apply pattern pairs;

means for determining a match pattern corresponding to a resource that will be modified by execution of a graph manipulation operation;

means for evaluating security conditions specified by the apply pattern associated with the determined match pattern to determine if a source entity of the graph manipulation operation may access all of the sub-graphs specified by the apply pattern; and means for preventing execution of the graph manipulation operation if the security conditions evaluate to false.

* * * * *

UNITED STATES PATENT AND TRADEMARK OFFICE
CERTIFICATE OF CORRECTION

PATENT NO.        : 8,301,660 B2
APPLICATION NO.   : 12/507244
DATED             : October 30, 2012
INVENTOR(S)       : Yalamanchi It is certified that error appears in the above-identified patent and that said Letters Patent is hereby corrected as shown below:

In column 8, line 16, delete "Susan^^xsd.string"]" and insert -- "*Susan^^xsd:string*"] --, therefor.

In column 10, line 2, delete "one of of the" and insert -- one of the --, therefor.

In column 10, line 52, delete "30 for" and insert -- for --, therefor.

In column 11, line 36, delete "trinles" and insert -- triples --, therefor.

In column 13, line 56-57, delete "710 input/output" and insert -- 710. Input/output --, therefor.

In column 14, line 59, in Claim 3, delete "will be," and insert -- will be --, therefor.

In column 14, line 64, in Claim 4, delete "manipulated" and insert -- manipulation --, therefor.

In column 16, line 46, in Claim 18, delete "subject and evaluates" and insert -- subject, and evaluate --, therefor.

In column 16, line 53, in Claim 18, delete "subject and evaluates" and insert -- subject, and evaluate --, therefor.

Signed and Sealed this
Nineteenth Day of February, 2013

Teresa Stanek Rea
*Acting Director of the United States Patent and Trademark Office*